(12) United States Patent
Yang (10) Patent No.: US 10,836,326 B1
(45) Date of Patent: Nov. 17, 2020

(54) VEHICLE MOBILE PHONE HOLDER

(71) Applicant: Liping Yang, Shenzhen (CN)

(72) Inventor: Liping Yang, Shenzhen (CN)

( * ) Notice: Subject to any disclaimer, the term of this patent is extended or adjusted under 35 U.S.C. 154(b) by 0 days.

(21) Appl. No.: 16/573,633

(22) Filed: Sep. 17, 2019

(30) Foreign Application Priority Data

May 31, 2019 (CN) .................. 2019 2 0821682 U (51) Int. Cl.
*H04M 1/00* (2006.01)
*B60R 11/02* (2006.01)
*H04B 1/3877* (2015.01)

(52) U.S. Cl.
CPC ........ *B60R 11/0241* (2013.01); *H04B 1/3877* (2013.01)

(58) Field of Classification Search
CPC .................... B60R 11/0241; H04B 1/3877
USPC ...................................... 455/575.1
See application file for complete search history.

(56) References Cited

U.S. PATENT DOCUMENTS

| | | | |
|---|---|---|---|
| 8,333,353 B1* | 12/2012 | Silverman | F16M 11/2078 248/205.6 |
| 9,155,213 B2* | 10/2015 | Jones | F16M 13/04 |
| 9,194,536 B2* | 11/2015 | Kim | G06F 1/1632 |
| 9,577,467 B1* | 2/2017 | Karanikos | H02J 7/0027 |
| 10,180,251 B2* | 1/2019 | Duque | H02J 7/0027 |
| 2016/0242778 A1* | 8/2016 | Xu | A61B 17/08 |
| 2016/0324681 A1* | 11/2016 | Flanagan | A61B 5/4818 |
| 2020/0092965 A1* | 3/2020 | Lange | F21V 23/0492 |

\* cited by examiner

*Primary Examiner* — Kathy W Wang-Hurst
*Assistant Examiner* — Max Mathew
(74) *Attorney, Agent, or Firm* — Bay State IP, LLC (57) ABSTRACT

The disclosure provides a vehicle mobile phone holder, including a base, a surface cover, a hinge member making a clamp force between the base and the surface cover, and a wireless charging component; when the surface cover is rotated to have an included angle with the base, certain clamp force is formed between the surface cover and the base to clamp a mobile phone in between the surface cover and the base. The wireless charging component has one end in rotatable connection with the base, and a rotation axis of the wireless charging component is parallel to an axis of the hinge member. According to the disclosure, the base of the vehicle mobile phone holder is fixed in a car; when a mobile phone needs to be charged, the mobile phone may be clamped tight between the base and the surface cover.

9 Claims, 9 Drawing Sheets

VEHICLE MOBILE PHONE HOLDER

CROSS REFERENCE TO RELATED APPLICATION

This application claims the benefit of and takes priority from Chinese Patent Application Serial No. 201920821682.0 filed on May 31, 2019, the contents of which are herein incorporated by reference.

TECHNICAL FIELD

The disclosure relates to the technical field of mobile phone holders, and in particular to a vehicle mobile phone holder.

BACKGROUND OF THE INVENTION

Mobile phones have become an indispensable part of people's life, and people are using mobile phones at all times. Since mobile phones are powered by batteries, it is often to appear problems that the mobile phones are of low battery and the normal usage is affected, for example, it is often to see problems that mobile phones are of low battery during driving processes. To charge a mobile phone in a car, a data line may be utilized to directly connect to the mobile phone; however, the length of the data line limits the position of the mobile phone, furthermore, the existence of the data line will affect the tidiness inside the car. Some mobile phone users would choose to use wireless charges; wireless charging, also called induction charging or non-contact induction charging, is to transfer energy to a device utilizing electricity from a power supply unit by means of inductive coupling, and the device charges the battery using the received energy. At present, commonly used wireless chargers include wireless charging station and wireless chargers. Although present wireless chargers may be placed on a plane surface inside a car, it is difficult to fix the position of a mobile phone in a bumpy moving car and it is not easy to learn the charging condition of the mobile phone during the driving process.

Therefore, how to solve the problem that it is difficult to fix the position of a mobile phone while the mobile phone is charged in a moving vehicle becomes an important technical problem to be solved by those skilled in the art.

SUMMARY OF THE INVENTION

To at least overcome the problems existing in related art to certain extent, the disclosure provides a vehicle mobile phone holder, which can solve the problem that it is difficult to fix the position of a mobile phone while the mobile phone is charged in a moving vehicle.

The disclosure is implemented in the following way. A vehicle mobile phone holder, including a base, a surface cover, a hinge member making a clamp force between the base and the surface cover, and a wireless charging component; wherein the wireless charging component has one end in rotatable connection with the base, a rotation axis of the wireless charging component is parallel to an axis of the hinge member; and a rotation position of the surface cover includes a first position where the surface cover is able to work with the base to clamp a mobile phone and a second position where the surface cover is buckled with the base; when the surface cover is at the first position, the mobile phone is clamped above the base and the wireless charging component may be rotated to a position to contact and attach onto the back of the mobile phone; when the surface cover is at the second position, the surface cover is buckled with the base and the wireless charging component is rotated to be below an upper surface of the base.

Preferably, the base has one end, far away from the hinge member, defining a first limit groove used for limiting a position of a lower end of the mobile phone; the surface cover has one end, far away from the hinge member, defining a second limit groove used for limiting a position of an upper end of the mobile phone and provided with a limit plate which is located on one side of the second limit groove far away from the hinge member; a length direction of the limit plate, a length direction of the first limit groove and a length direction of the second limit groove are all parallel to the axis of the hinge member; and an external surface of the wireless charging component in contact with the mobile phone is provided with an adsorption piece.

Preferably, the surface cover is further provided with a clamp device used for clamping the upper end of the mobile phone along the horizontal direction, the clamp device and the surface cover are in slide connection, and a slide position of the clamp device includes a third position where the clamp device extends out of the surface cover and may clamp the upper end of the mobile phone and a fourth position where the clamp device is hidden inside the surface cover.

Preferably, the clamp device includes two clamp arm members, the two clamp arm members are connected through a push rod, the clamp arm member includes a slide block, a clamp arm in rotatable connection with the slide block, and an elastic piece arranged between the slide block and the clamp arm, the elastic piece has one end in fixed connection with the slide block and the other end in fixed connection with the clamp arm, one sides of the two clamp arms facing each other define an arc-shaped groove, a side wall on one end of the surface cover far away from the hinge member defines an opening for the clamp arm to pass through, a slide direction of the slide block is perpendicular to the axis of the hinge member, and a rotation axis of the clamp arm is perpendicular to the surface cover.

Preferably, a limit member used for limiting the position of the push rod is provided between the clamp arm member and the surface cover; the limit member includes a rubber column sleeved outside the push rod, and a first stop block and a second stop block that are arranged on the surface cover; one sides of the first stop block and the second stop block near the push rod are provided with a clamp groove; the rubber column may be clamped inside the clamp groove; and a distance between the first stop block and the axis of the hinge member is greater than a distance between the second stop block and the axis of the hinge member.

Preferably, a rotation device used for rotating the base relative to a mounting surface is provided below the base, and the rotation device has an upper end in rotatable connection with the base and a lower end in fixed connection with the mounting surface.

Preferably, the rotation device includes a support whose upper end is in rotatable connection with the base, a rotation limit member is provided between the support and the base, and the support has a lower end provided with a rubber ring used for fixing with a mounting surface.

Preferably, the rotation limit member includes an elastic protrusion arranged on a lower end of the base and a plurality of grooves defined on an upper surface of the support, and the plurality of grooves are evenly distributed in a circle shape.

Preferably, a first accommodation groove used for accommodating a mobile phone charge line is further defined below the first limit groove; the first limit groove is in communication with the first accommodation groove; and the base has a left side wall or right side wall defining an insertion interface for the wireless charging component to connect to an external power supply.

Preferably, the base defines a second accommodation groove used for accommodating aromatherapy and is provided with a seal cap which is arranged at an opening end of the second accommodation groove, and the seal cap defines an aromatherapy hole.

The technical scheme provided by the disclosure has the following benefits.

The vehicle mobile phone holder provided by the disclosure includes a base, a surface cover, a hinge member making a clamp force between the base and the surface cover, and a wireless charging component; the base and the surface cover are in rotatable connection through a hinger member, and when the surface cover is rotated to have an included angle with the base, certain clamp force is formed between the surface cover and the base; a mobile phone is obliquely placed between the surface cover and the base, upper and lower ends of the mobile phone lean against the surface cover and the base respectively, and the above clamp force clamps the mobile phone in between the surface cover and the base. The wireless charging component has one end in rotatable connection with the base, and a rotation axis of the wireless charging component is parallel to an axis of the hinge member. A rotation position of the surface cover includes a first position where the surface cover is able to work with the base to clamp the mobile phone and a second position where the surface cover is buckled with the base; when the surface cover is at the first position, the mobile phone is clamped above the base and the wireless charging component is rotated to contact and attach onto the back of the mobile phone, thereby charging the mobile phone; when the surface cover is at the second position, the wireless charging component is rotated to be below an upper surface of the base, so that the surface cover is buckled with the base. According to the disclosure, the base of the vehicle mobile phone holder is fixed in a car, for example, on an upper surface of a console in the car; when the mobile phone needs to be charged, the mobile phone may be clamped tight between the base and the surface cover, and the wireless charging component is rotated to a position to attach onto the back of the mobile phone; while the mobile phone is charged using the wireless charging component, the clamp force between the base and the surface cover can fix the mobile phone, and can guarantee the stability and safety of the mobile phone in a bumpy moving car.

In addition, when not to charge the mobile phone, the vehicle mobile phone holder may be purely used as a mobile phone support, and it is only needed to rotate the wireless charging component to be below the upper surface of the base. When the mobile phone is fixed on the console in a car through the vehicle mobile phone holder, it can avoid that the driver's sight takes away the driving road while the driver is checking the mobile navigation, which to some extent is beneficial to driving safety. The vehicle mobile phone holder prevents the mounting at a car air conditioning vent, thereby preventing the air conditioning vent against impacting the heat radiation of the mobile phone or easily wetting the components of the mobile phone.

It should be noted that the above general description and the detail hereinafter are merely exemplary and illustrative, rather than restricting the disclosure.

BRIEF DESCRIPTION OF THE DRAWINGS

For a better understanding of the technical scheme in the embodiments of the disclosure or in the prior art, accompanying drawings needed in the description of the embodiments or the prior art are simply illustrated below. Obviously, the accompanying drawings described below are some embodiments of the disclosure. For the ordinary skill in the field, other accompanying drawings may be obtained according to these accompanying drawings without creative work.

DESCRIPTION OF DESIGNATORS IN DRAWINGS OF SPECIFIC EMBODIMENTS

1 represents a base, a represents a surface cover, 3 represents a hinge member, 4 represents a wireless charging component, 5 represents a mobile phone, 6 represents a first limit groove, 7 represents a limit plate, 8 represents a second limit groove, 9 represents a clamp arm member, 10 represents a push rod, 11 represents a slide block, 12 represents a clamp arm, 13 represents an elastic piece, 14 represents an arc-shaped groove, 15 represents an opening, 16 represents a rubber column, 17 represents a first stop block, 18 represents a second stop block, 19 represents a clamp groove, 20 represents a support, 21 represents a rubber ring, 22 represents an elastic protrusion, 23 represents a recess, 24 represents a first accommodation groove, 25 represents an insertion interface, 26 represents an aromatherapy hole, 27 represents a seal cap, 28 represents a pin shaft, and 29 represents a torsion spring.

DETAILED DESCRIPTION OF THE SEVERAL EMBODIMENTS

The purpose, the technical scheme and the advantages of the disclosure will become more clearly understood from detailed description of the technical scheme of the disclosure. Obviously, the embodiments described hereinafter are simply part embodiments of the disclosure, but all the embodiments. All other embodiments obtained by the ordinary skill in the art based on the embodiments in the disclosure without creative work are intended to be included in the scope of protection of the disclosure.

The present embodiment aims to provide a vehicle mobile phone holder; when the mobile phone is charged using the wireless charging component, the mobile phone is placed between the base and the surface cover which have a clamp force therebetween; the vehicle mobile phone holder guarantees the fixing between the mobile phone and the base/the mounting surface while the mobile phone is charged, and thus guarantees the stability and safety of the mobile phone in a bumpy moving vehicle.

Embodiments are illustrated below with reference to accompanying drawings. In addition, the embodiments described below should not limit the content of the disclosure recorded in claims appended herein. Furthermore, the entire contents of the constitutions represented by the following embodiments are not limited to those necessary for the solution of the disclosure recorded in the claims appended herein.

Referring to FIG. 1 to FIG. 4, structure diagrams of a vehicle mobile phone holder in some exemplary embodiments are illustrated. The vehicle mobile phone holder provided by the present embodiment includes a base 1, a surface cover 2, a hinge member 3 making a clamp force between the base 1 and the surface cover 2, and a wireless charging component 4; the base 1 and the surface cover 2 are in rotatable connection through a hinger member 3, and when the surface cover 2 is rotated to have an included angle with the base 1, certain clamp force is formed between the surface cover 2 and the base 1; a mobile phone 5 is obliquely placed between the surface cover 2 and the base 1, upper and lower ends of the mobile phone 5 lean against the surface cover 2 and the base 1 respectively, and the above clamp force clamps the mobile phone 5 in between the surface cover 2 and the base 1. The wireless charging component 4 has one end in rotatable connection with the base 1, and a rotation axis of the wireless charging component 4 is parallel to an axis of the hinge member 3. A rotation position of the surface cover 2 includes a first position where the surface cover 2 is able to work with the base 1 to clamp the mobile phone 5 and a second position where the surface cover 2 is buckled with the base 1; when the surface cover 2 is at the first position, the mobile phone 5 is clamped above the base 1 and the wireless charging component 5 is rotated to contact and attach onto the back of the mobile phone 5, thereby charging the mobile phone 5; when the surface cover 2 is at the second position, the wireless charging component 4 is rotated to be below an upper surface of the base 1, so that the surface cover 2 is buckled with the base 1. According to the disclosure, the base 1 of the vehicle mobile phone holder is fixed in a car, for example, on an upper surface of a console in the car; when the mobile phone 5 needs to be charged, the mobile phone may be clamped tight between the base 1 and the surface cover 2, and the wireless charging component 4 is rotated to a position to attach onto the back of the mobile phone 5; while the mobile phone 5 is charged using the wireless charging component 4, the clamp force between the base 1 and the surface cover 2 can fix the mobile phone, and can guarantee the stability and safety of the mobile phone 5 in a bumpy moving car.

In addition, when not to charge the mobile phone 5, the vehicle mobile phone holder may be purely used as a mobile phone support, and it is only needed to rotate the wireless charging component 4 to be below the upper surface of the base 1. When the mobile phone 5 is fixed on the console in a car through the vehicle mobile phone holder, it can avoid that the driver's sight takes away the driving road while the driver is checking the mobile navigation, which to some extent is beneficial to driving safety. The vehicle mobile phone holder prevents the mounting at a car air conditioning vent, thereby preventing the air conditioning vent against impacting the heat radiation of the mobile phone 5 or easily wetting the components of the mobile phone 5.

Figure 5:
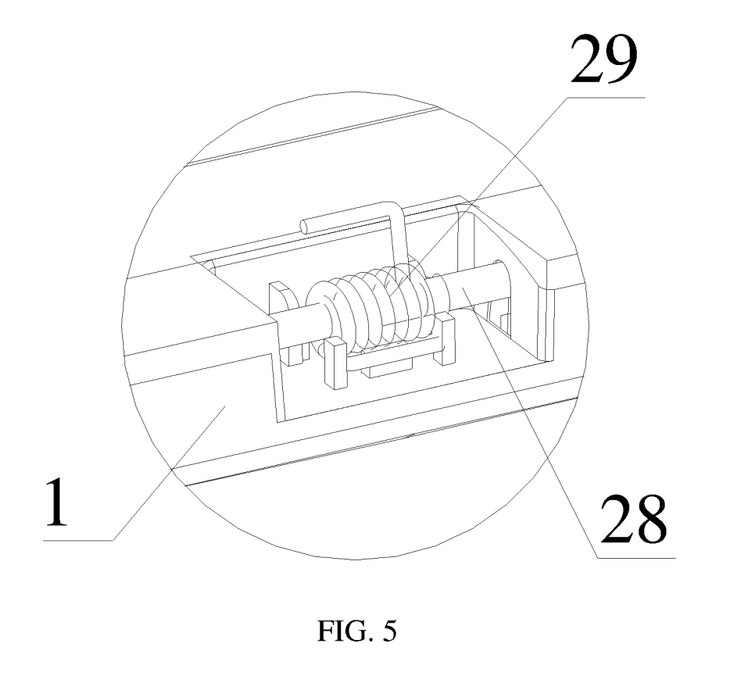
FIG. 5 is a structure diagram of a hinge member between a base and a surface cover illustrated in an embodiment of the disclosure.

The above hinger member 3 includes a pin shaft 28 and a torsion spring 9; referring to FIG. 5, the base 1 and the surface cover 2 are hinged together through the pin shaft 28, the torsion spring 9 is sleeved outside the pin shaft 28, and the torsion spring 28 has one end in fixed connection with the base 1 and the other end in fixed connection with the surface cover 2; when the base 1 is buckled with the surface cover 2, the torsion spring 28 is in a natural state; in the process that the surface cover 2 rotates relative to the base 1, the torsion spring 28 deforms and accumulates elastic potential energy, so that a clamp force is enabled between the surface cover 2 and the base 1.

The above wireless charging component 4 includes a shell, a coil, a circuit board and a connection line; the coil and the connection line are connected to the circuit board respectively, the coil and the circuit board are arranged inside the shell, the base 1 has a left side wall or right side wall defining an insertion interface 25 for the wireless charging component 4 to connect to an external power supply, the opposite end of the connection line connected to the coil extends out of the shell and is connected to an external power supply at the insertion interface 25 to charge the wireless charging component 4, thereby charging the mobile phone 5 when the mobile phone 5 contacts the shell. The insertion interface 25 may be a Type-C interface, also may be a Micro USB 2.0 interface, via which the wireless charging component 4 may be electrified using a general mobile phone charge line. It is convenient to use.

In the present embodiment, the base 1 has one end, far away from the hinge member 3, defining a first limit groove 6 used for limiting a position of a lower end of the mobile phone 5; the surface cover 2 has one end, far away from the hinge member 3, defining a second limit groove 8 and provided with a limit plate 7; the second limit groove 8 is used for limiting a position of an upper end of the mobile phone 5, and the limit plate 7 is provided on one side of the second limit groove 8 far away from the hinge member 3, to further limit the position of the upper end of the mobile phone 5 relative to the surface cover 2. A length direction of the limit plate 7, a length direction of the first limit groove 6 and a length direction of the second limit groove 8 are parallel to each other and are all parallel to the axis of the hinge member 3. When the mobile phone 5 is clamped between the base 1 and the surface cover 2, the wireless charging component 4 is rotated to a position to attach onto the back of the mobile phone 5; in order to guarantee the stability of the attachment and contact between the wireless charging component 4 and the mobile phone 5, an external surface of the wireless charging component 4 in contact with the mobile phone 5 is provided with an adsorption piece, through which the wireless charging component 4 and the mobile phone 5 are attached together to guarantee the stable charge to the mobile phone 5. The above adsorption piece may be a nano micro-adsorption tape, and the nano micro-adsorption tape has many micro orifices on the surface thereof, so as to be easily adsorbed on the back of the mobile phone 5. The nano micro-adsorption tape is strong in adsorption force, is easy to detach, leaves no trace and can be water washed and repeatedly used.

The mobile phone 5 may be horizontally placed or vertically placed on the vehicle mobile phone holder. When the mobile phone 5 is horizontally placed on the vehicle mobile phone holder, that is, two long edges of the mobile phone 5 are placed horizontally, the lower end of the mobile phone 5 is located in the first limit groove 6 defined on the base 1, and the upper end of the mobile phone 5 is located in the second limit groove 8 defined on the surface cover 2; referring to FIG. 2, a stable triangle structure is formed among the base 1, the surface cover 2 and the mobile phone 5, and the clamp force between the surface cover 2 and the base 1 can guarantee the stability of the mobile phone 5. If to charge the mobile phone 5, the mobile phone 5 may be charged by direct connection to a mobile phone charge line connected to an external power supply, or the shell of the wireless charging component 4 may be rotated to a position to attach onto the back of the mobile phone, so that the wireless charging component 4 is adsorbed onto the back of the mobile phone through the adsorption piece, to guarantee the stability of charging state.

Figure 4:
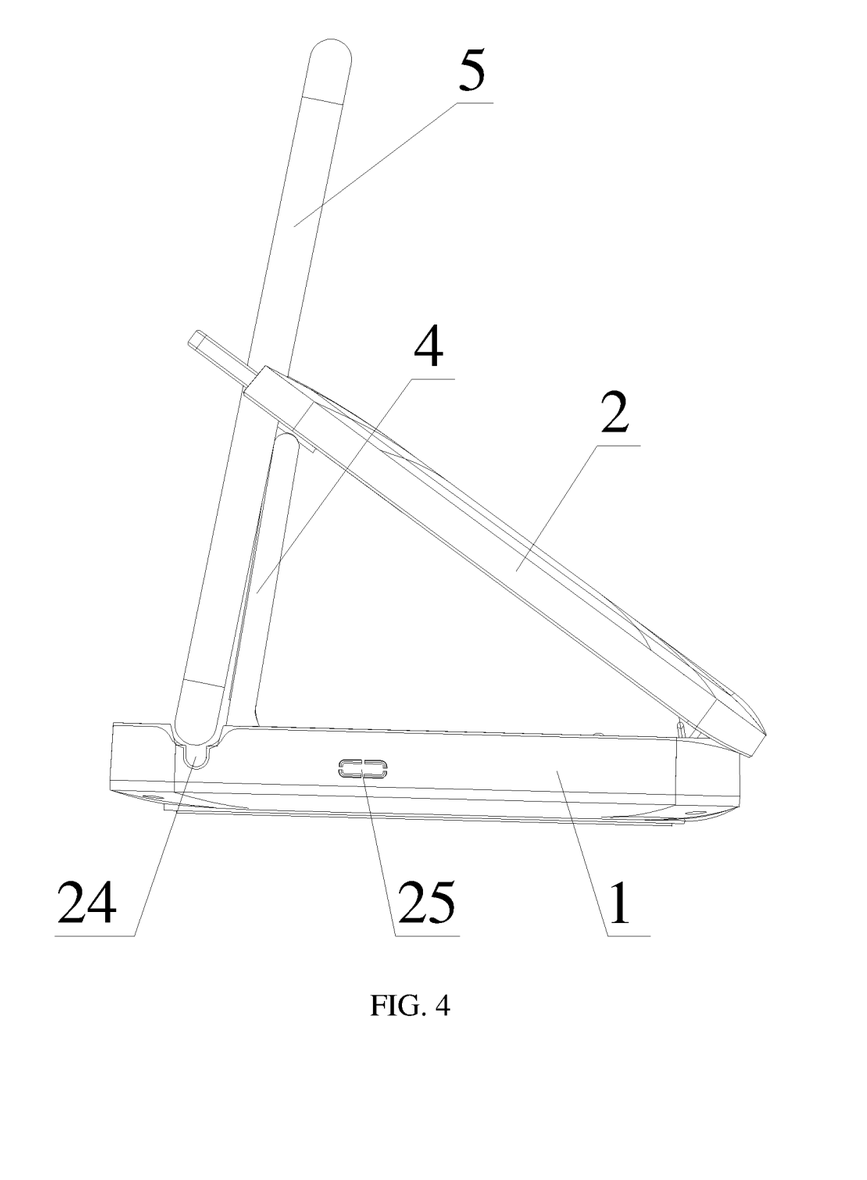
FIG. 4 is a side view of FIG. 3.

When the mobile phone 5 is vertically placed on the vehicle mobile phone holder, that is, two short edges of the mobile phone 5 are placed horizontally, in consideration of the relative size of the vehicle mobile phone holder to the mobile phone 5 and the angle of inclination of the mobile phone 5 when placed on the vehicle mobile phone holder, to facilitate a user to check the mobile phone 5, the upper end of the mobile phone 5 may extend out of the surface cover 2, as a result, the mobile phone 5 may lean on the edge of the surface cover 2 and cannot prop up the surface cover 2; in order to guarantee certain included angle between the surface cover 2 and the base 1, such that the surface cover 2 has a supporting function for the upper end of the mobile hone 5, the wireless charging component 4 may be rotated such that the upper end thereof leans against the second limit groove 8 defined on the surface cover 2, then the surface cover 2 is supported by the shell of the wireless charging component 4, and the condition that the surface cover 2 is buckled with the base 1 under the action of the hinger member 3 is avoided; a stable triangle structure is formed among the base 1, the surface cover 2 and the wireless charging component 4; the lower end of the mobile phone 5 is located in the first limit groove 6 defined on the base 1, and the middle upper part of the mobile phone 5 is supported on the edge of the surface cover 2, referring to FIG. 4.

Figure 1:
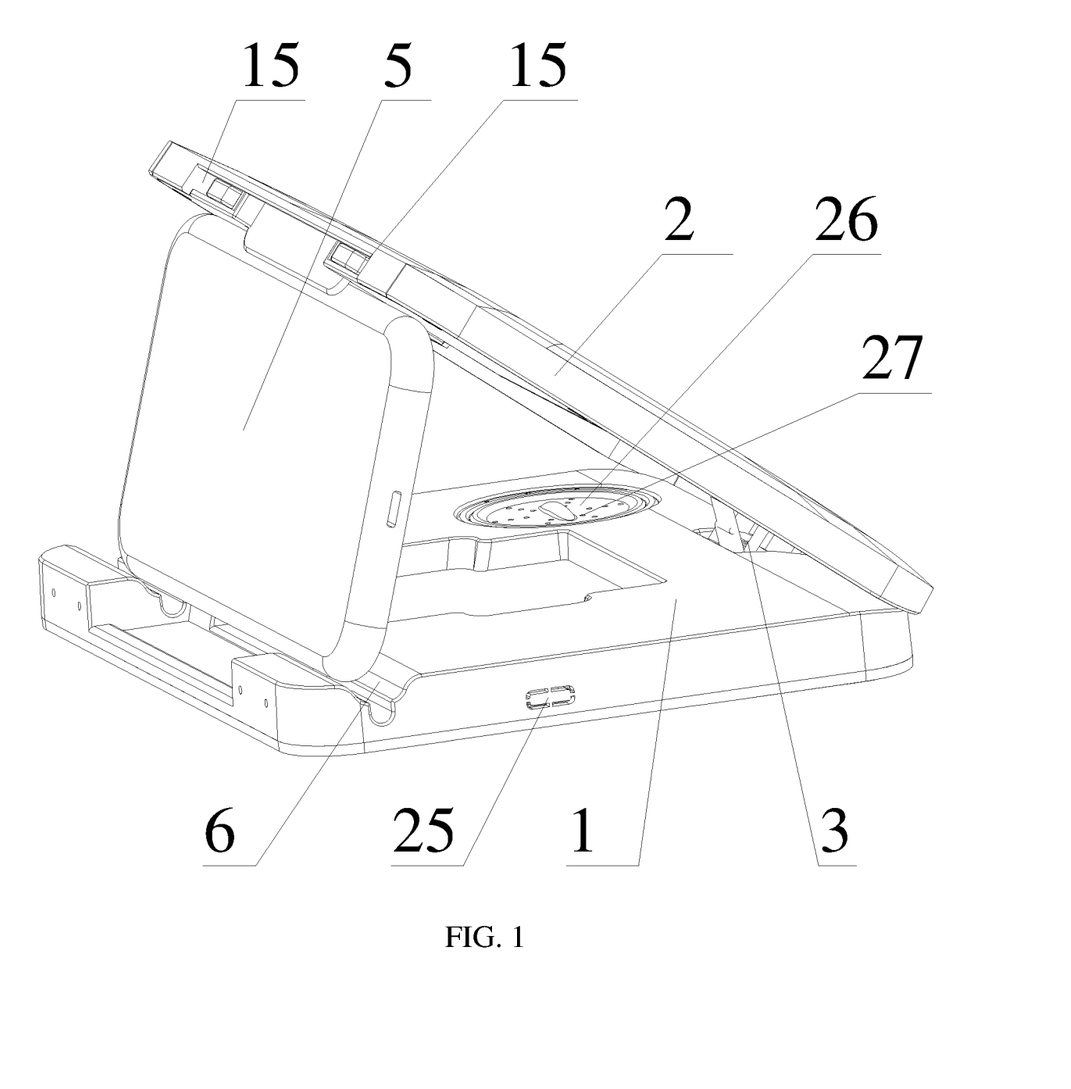
FIG. 1 is a structure diagram of a vehicle mobile phone holder illustrated in an embodiment of the disclosure, in which a mobile phone is horizontally placed.
Figure 2:
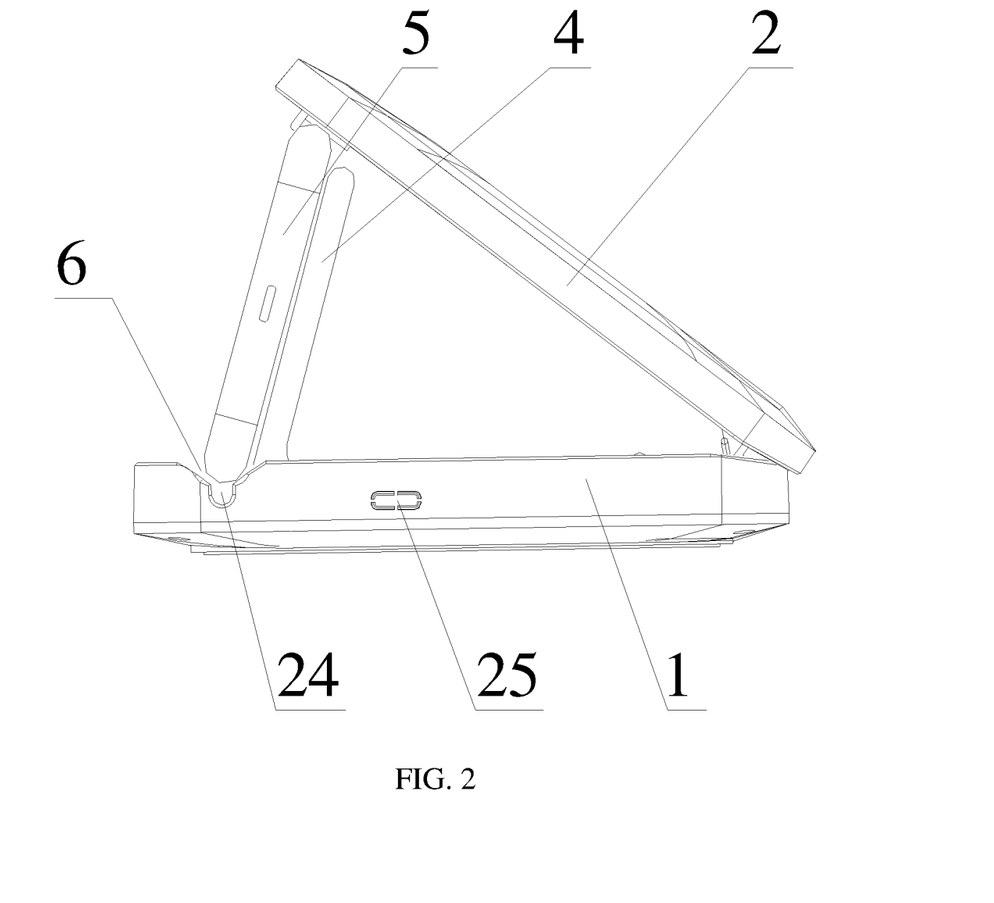
FIG. 2 is a side view of FIG. 1.
Figure 3:
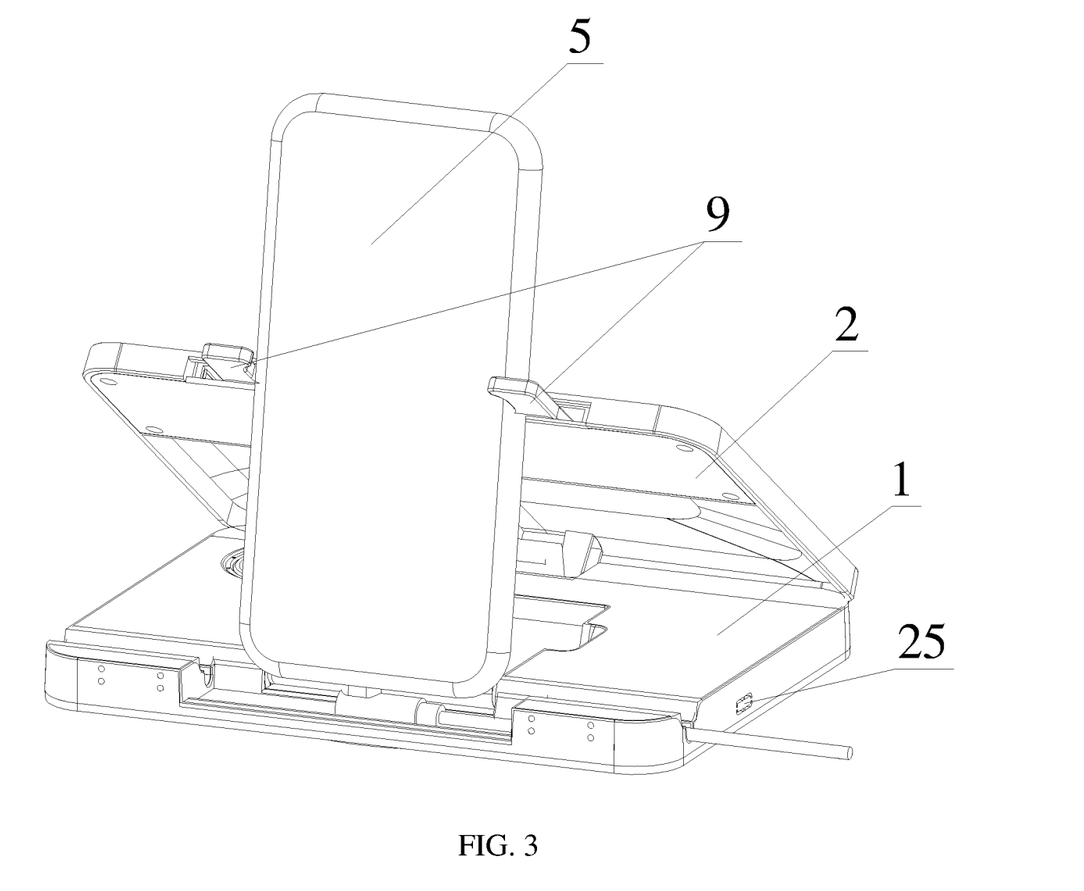
FIG. 3 is a structure diagram of a vehicle mobile phone holder illustrated in an embodiment of the disclosure, in which a mobile phone is vertically placed.

If to charge the mobile phone 5, the mobile phone 5 needs to be charged by direct connection to a mobile phone charge line connected to an external power supply. Considering that charge insertion interfaces of common mobile phones are defined on lower end faces of the mobile phones, when the mobile phone 5 is vertically placed, the charge insertion interface of the mobile phone is blocked in the first limit groove 6 defined on the base 1, to facilitate the connection of the mobile phone 5 and the mobile phone charge line, a first accommodation groove 24 used for accommodating a mobile phone charge line is further defined below the first limit groove 6, the first limit groove 6 is in communication with the first accommodation groove 24, and the mobile phone charge line has one end in connection with the charge insertion interface of the mobile phone 5 and the other end extends out of the base 1 through the first accommodation groove 24 to connect to an external power supply. In this condition, the mobile phone charge line may be a rectangular mobile phone charge line, as shown in FIG. 3.

In a preferred embodiment, in order to guarantee that the mobile phone 5 is not affected by a bumpy road when vertically placed, the surface cover 2 is further provided with a clamp device used for clamping the upper end of the mobile phone 5 along the horizontal direction, so that the middle upper part of the mobile phone 5 is fixed with the surface cover 2. The clamp device and the surface cover 2 are in slide connection, and a slide position of the clamp device includes a third position where the clamp device extends out of the surface cover 2 and may clamp the upper end of the mobile phone 5 and a fourth position where the clamp device is hidden inside the surface cover 2; when the mobile phone 5 is vertically placed, the clamp device slides to the third position, the lower end of the mobile phone 5 is located in the first limit groove 6, the upper end of the mobile phone 5 is supported on one side of the surface cover 2 far away from the hinger member 3 and is in fixed connection with the surface cover 2 through the clamp device, such arrangement may guarantee the stability of the mobile phone 5 in vertical placement.

Figure 7:
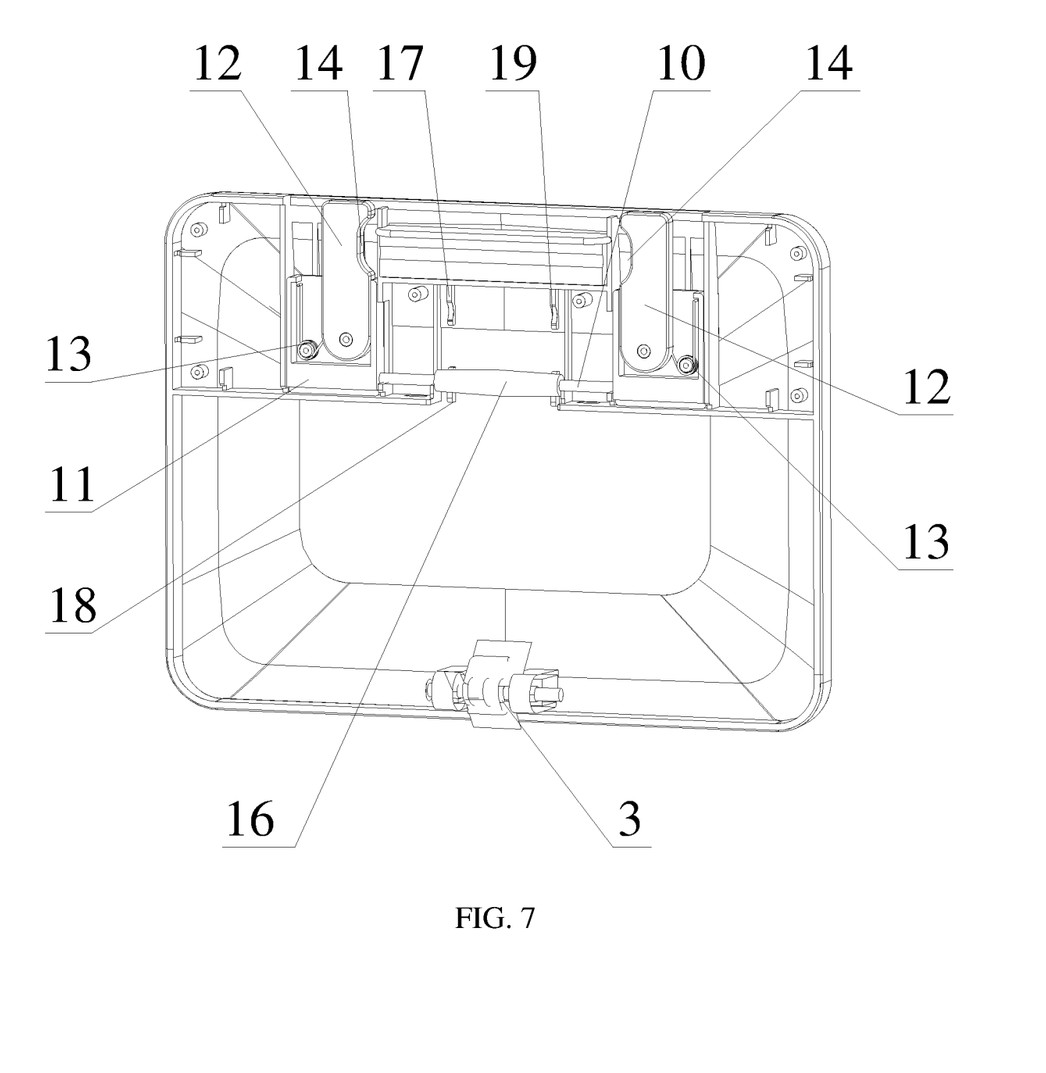
FIG. 7 is a structure diagram of a clamp device illustrated in an embodiment of the disclosure.

During implementation, the above clamp device includes two clamp arm members 9, the two clamp arm members 9 are connected through a push rod 10, and positions of the two clamp arm members 9 may be adjusted through the push rod 10, as shown in FIG. 7. The clamp arm member 9 includes a slide block 11, a clamp arm 12 in rotatable connection with the slide block 11, and an elastic piece 13 arranged between the slide block 11 and the clamp arm 12, the surface cover 2 includes an upper surface shell and a lower surface shell that are buckled together, a space for reciprocation of the slide block 11 is defined between the upper surface shell and the lower surface shell, the upper surface shell or the lower surface shell is provided with a rail, and the slide block 11 defines a slide groove for the rail to embed in, so that the slide block 11 and the surface cover 2 are in slide connection. The clamp arm 12 is hinged with the slide block 11, a rotation axis of the clamp arm 12 is perpendicular to the surface cover 2, the elastic piece 13 has one end in fixed connection with the slide block 11 and the other end in fixed connection with the clamp arm 12, and the opposite ends of the two clamp arms 12 hinged with the slide blocks 11 are clamp portions used for clamping the mobile phone 5; when the elastic piece 13 is in a natural state, the two clamp arms 12 are parallel to each other; in the process that the clamp arm 12 rotates relative to the slide block 11, the elastic piece 13 deforms and accumulates elastic potential energy; when the clamp portions of the two clamp arms 12 move away from each other, the elastic piece 13 makes a clamp force between the two clamp arms 12, and the mobile phone 5 may be clamped by the two clamp arms 12 when placed therebetween. The elastic piece 13 here may be a torsion spring. One sides of the clamp portions of the two clamp arms 12 facing each other define an arc-shaped groove 14, and two sides of the mobile phone 5 may be clamped in the two arc-shaped grooves 14. A side wall on one end of the surface cover 2 far away from the hinge member 3 defines an opening 15 for the clamp arm 12 to pass through, a slide direction of the slide block 11 is perpendicular to the axis of the hinge member 3, two ends of the push rod 10 are in fixed connection with the two slide blocks 11 respectively, and the position of the slide block 11 may be adjusted by pushing the push rod 10.

In the preferred scheme of the present embodiment, when the mobile phone 5 is horizontally placed, the clamp arm member 9 is not used, and at this time the clamp arm member 9 needs to be hidden inside the surface cover 2; during the bump of the car, in order to prevent the clamp arm 12 from shaking inside the surface cover 2 to lead to noises, a limit member used for limiting the position of the push rod 10 is provided between the clamp arm member 9 and the surface cover 2. The limit member includes a rubber column 16 sleeved outside the push rod 10, and a first stop block 17 and a second stop block 18 that are arranged on the surface cover 2; a distance between the first stop block 17 and the axis of the hinge member 3 is greater than a distance between the second stop block 18 and the axis of the hinge member 3; one sides of the first stop block 17 and the second stop block 18 near the push rod 10 are provided with a clamp groove 19; and the rubber column 16 may be clamped inside the clamp groove 19. When the mobile phone 5 needs to be vertically placed, push the push rod 10 through the rubber column 16 and make the rubber column 16 clamped in the clamp groove 19 defined on the first stop block 17, so as to fix the position of the slide block 11; when not to use the clamp arm member 9, push the push rod 10 through the rubber column 16, so that the rubber column 16 is disengaged from the clamping of the first stop block 17 and that the rubber column 16 is clamped in the clamp groove 19 defined on the second stop block 18, thereby fixing the position of the slide block 11.

In a preferred embodiment, a rotation device is provided below the base 1, and the rotation device has an upper end in rotatable connection with the base 1 and a lower end in fixed connection with a mounting surface; by rotating the base 1 relative to the mounting surface, the angle of the mobile phone 5 may be adjusted to facilitate a driver to check the mobile phone.

Figure 6:
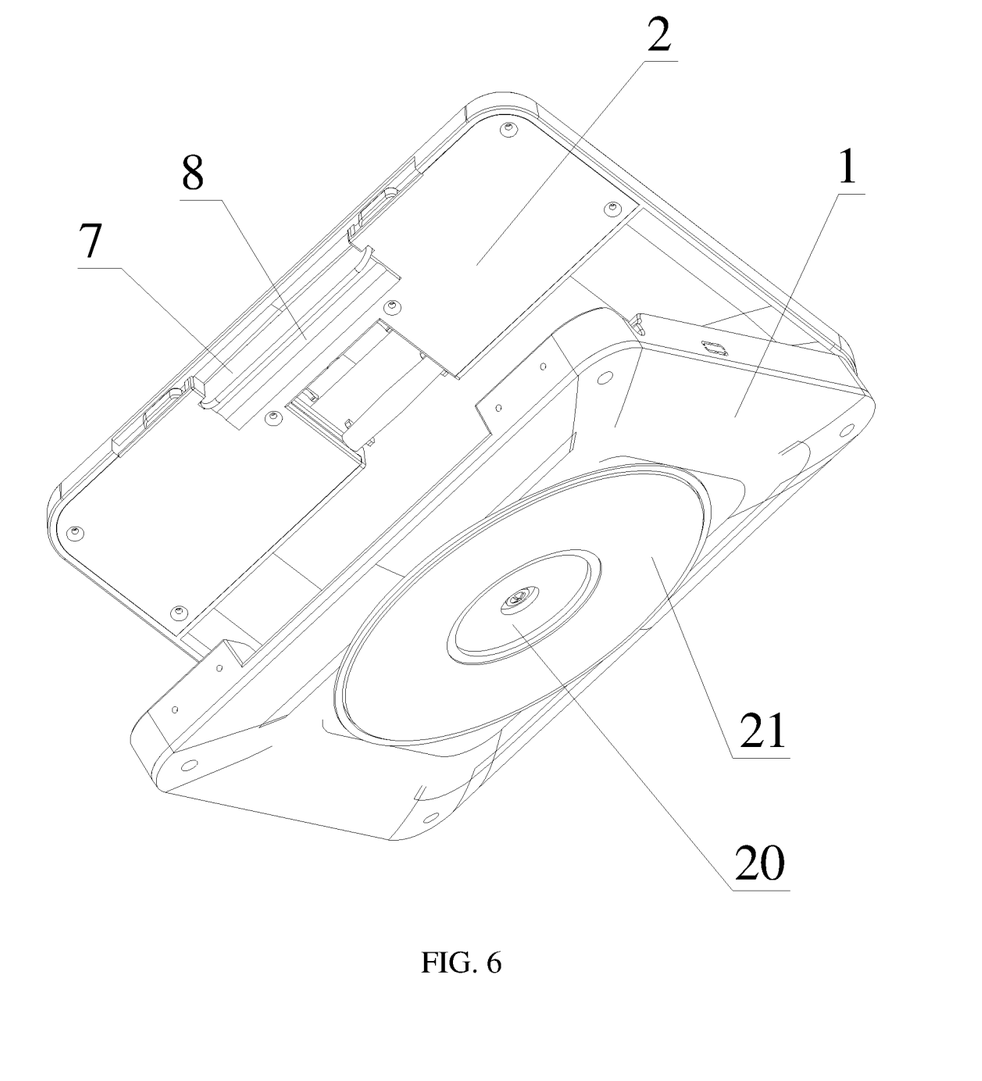
FIG. 6 is a structure diagram of a base and a surface cover illustrated in an embodiment of the disclosure, which have an included angle therebetween.

During implementation, the rotation device includes a support 20, and the support 20 is hinged with the base 1. A rotation limit member is provided between the support 20 and the base 1; after the angle of the mobile phone 5 is adjusted, the relative position of the base 1 to the support 20 may be fixed through the rotation limit member, thereby preventing the mobile phone 5 and the base 1 generating rotation due to bump. The support 20 has a lower end provided with a rubber ring 21 used for fixing with a mounting surface, referring to FIG. 6; the support 20 is in fixed connection with a mounting surface through the rubber ring 21, which is convenient and fast.

Figure 8:
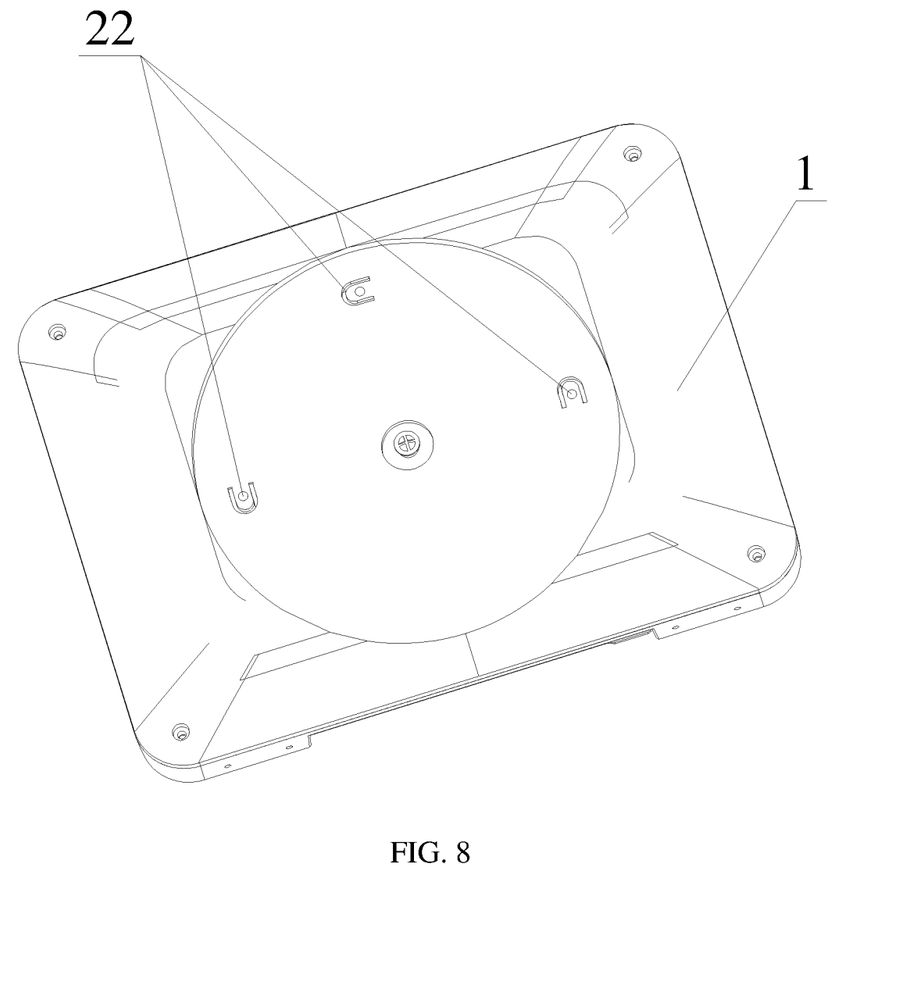
FIG. 8 is a structure diagram of an elastic protrusion illustrated in an embodiment of the disclosure.
Figure 9:
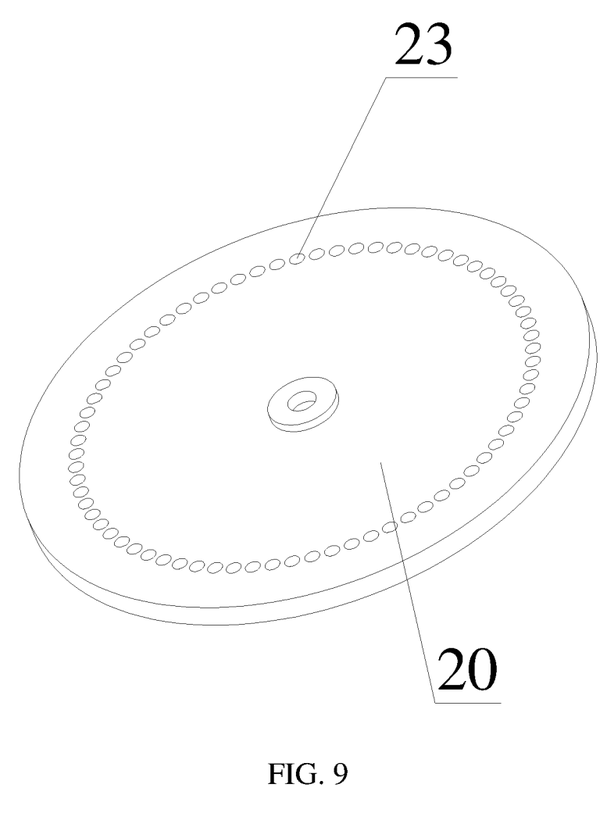
FIG. 9 is a structure diagram of a support illustrated in an embodiment of the disclosure.

During implementation, the above rotation limit member includes an elastic protrusion 22 arranged on a lower end of the base 1 and a plurality of recesses 23 defined an upper surface of the support 20, referring to FIG. 8 to FIG. 9; the elastic protrusion 22 may be clamped inside the recess 23. The plurality of recesses 23 are evenly distributed in a circle shape around a hinge shaft for the base 1 and the support 20; after the support 20 is fixed on a mounting surface, by rotating the base 1, the elastic protrusion 22 may slide out of one recess 23 and then be clamped in a next recess 23, and continue rotate the base 1 until the mobile phone 5 rotates to an appropriate angle. The plurality of recesses 23 are evenly distributed, an angle corresponding to two adjacent recesses 23 is a minimum angle of adjustment of the mobile phone 5; the larger the number of the recesses 23 is, the higher the precision of adjustment of angle of the mobile phone 5 is.

In the present embodiment, the base 1 defines a second accommodation groove used for accommodating aromatherapy and is provided with a seal cap 27 which is arranged at an opening end of the second accommodation groove, and the seal cap 27 defines an aromatherapy hole 26 for making an inner cavity of the second accommodation groove communicated with the outside of the base 1; by placing aromatherapy materials inside the second accommodation groove, the aroma from the aromatherapy materials is emitted to the outside of the base 1 through the aromatherapy hole 26 to improve the interior environment of the car.

The above are the specific embodiments of the disclosure. However, the protection scope of the disclosure is not limited to the embodiments. Any variations or substitutions easily thought by one skill familiar with the technical field are intended to fall within the scope of protection of the disclosure. Therefore, the scope of protection of the disclosure should be based on the protection scope of the claims appended herein.

What is claimed is:

1. A vehicle mobile phone holder, comprising a base (1), a surface cover (2), a hinge member (3) making a clamp force between the base (1) and the surface cover (2), and a wireless charging component (4);
   wherein the base (1) has one end, far away from the hinge member (3), defining a first limit groove (6) used for limiting a position of a lower end of the mobile phone (5); the surface cover (2) has one end, far away from the hinge member (3), defining a second limit groove (8) used for limiting a position of an upper end of the mobile phone (5) and provided with a limit plate (7) which is located on one side of the second limit groove (8) far away from the hinge member (3); a length direction of the limit plate (7), a length direction of the first limit groove (6) and a length direction of the second limit groove (8) are all parallel to the axis of the hinge member (3); and an external surface of the wireless charging component (4) in contact with the mobile phone (5) is provided with an adsorption piece; and
   wherein the wireless charging component (4) has one end in rotatable connection with the base (1), a rotation axis of the wireless charging component (4) is parallel to an axis of the hinge member (3); and
   a rotation position of the surface cover (2) comprises a first position where the surface cover (2) is able to work with the base (1) to clamp a mobile phone (5) and a second position where the surface cover (2) is buckled with the base (1);
   when the surface cover (2) is at the first position, the mobile phone (5) is clamped above the base (1) and the wireless charging component (4) may be rotated to a position to contact and attach onto the back of the mobile phone (5); when the surface cover (2) is at the second position, the surface cover (2) is buckled with the base (1) and the wireless charging component (4) is rotated to be below an upper surface of the base (1).

2. The vehicle mobile phone holder according to claim 1, wherein the surface cover (2) is further provided with a clamp device used for clamping the upper end of the mobile phone (5) along the horizontal direction, the clamp device and the surface cover (2) are in slide connection, and a slide position of the clamp device comprises a third position where the clamp device extends out of the surface cover (2) and may clamp the upper end of the mobile phone (5) and a fourth position where the clamp device is hidden inside the surface cover (2).

3. The vehicle mobile phone holder according to claim 2, wherein the clamp device comprises two clamp arm members (9), the two clamp arm members (9) are connected through a push rod (10), the clamp arm member (9) comprises a slide block (11), a clamp arm (12) in rotatable connection with the slide block (11), and an elastic piece (13) arranged between the slide block (11) and the clamp arm (12), the elastic piece (13) has one end in fixed connection with the slide block (11) and the other end in fixed connection with the clamp arm (12), one sides of the two clamp arms (12) facing each other define an arc-shaped groove (14), a side wall on one end of the surface cover (2) far away from the hinge member (3) defines an opening (15) for the clamp arm (12) to pass through, a slide direction of the slide block (11) is perpendicular to the axis of the hinge member (3), and a rotation axis of the clamp arm (12) is perpendicular to the surface cover (2).

4. The vehicle mobile phone holder according to claim 3, wherein a limit member used for limiting the position of the push rod (10) is provided between the clamp arm member (9) and the surface cover (2); the limit member comprises a rubber column (16) sleeved outside the push rod (10), and a first stop block (17) and a second stop block (18) that are arranged on the surface cover (2); one sides of the first stop block (17) and the second stop block (18) near the push rod (10) are provided with a clamp groove (19); the rubber column (16) may be clamped inside the clamp groove (19); and a distance between the first stop block (17) and the axis of the hinge member (3) is greater than a distance between the second stop block (18) and the axis of the hinge member (3).

5. The vehicle mobile phone holder according to claim 1, wherein a rotation device used for rotating the base (1) relative to a mounting surface is provided below the base (1), and the rotation device has an upper end in rotatable connection with the base (1) and a lower end in fixed connection with the mounting surface.

6. The vehicle mobile phone holder according to claim 5, wherein the rotation device comprises a support (20) whose upper end is in rotatable connection with the base (1), a rotation limit member is provided between the support (20) and the base (1), and the support (20) has a lower end provided with a rubber ring (21) used for fixing with a mounting surface.

7. The vehicle mobile phone holder according to claim 6, wherein the rotation limit member comprises an elastic protrusion (22) arranged on a lower end of the base (1) and a plurality of recesses (23) defined an upper surface of the support (20), and the plurality of recesses (23) are evenly distributed in a circle shape.

8. The vehicle mobile phone holder according to claim 1, wherein a first accommodation groove (24) used for accommodating a mobile phone charge line is further defined below the first limit groove (6); the first limit groove (6) is in communication with the first accommodation groove (24); and the base (1) has a left side wall or right side wall defining an insertion interface (25) for the wireless charging component (4) to connect to an external power supply.

9. The vehicle mobile phone holder according to claim 1, wherein the base (1) defines a second accommodation groove used for accommodating aromatherapy and is provided with a seal cap (27) which is arranged at an opening end of the second accommodation groove, and the seal cap (27) defines an aromatherapy hole (26).

* * * * *